United States Patent
Kim et al.

(10) Patent No.: US 11,425,545 B2
(45) Date of Patent: Aug. 23, 2022

(54) MULTICHANNEL ACCESS CONTROL METHOD IN OVERLAPPED VEHICLE NETWORKS

(71) Applicant: INDUSTRY ACADEMIC COOPERATION FOUNDATION OF YEUNGNAM UNIVERSITY, Gyeongsan-si (KR)

(72) Inventors: Young Tak Kim, Gyeongsan-si (KR); Hyun Dong Hwang, Gyeongsan-si (KR)

(73) Assignee: Industry Academic Cooperation Foundation of Yeungnam University, Gyeongsan-Si (KR)

( * ) Notice: Subject to any disclaimer, the term of this patent is extended or adjusted under 35 U.S.C. 154(b) by 0 days.

(21) Appl. No.: 17/134,933

(22) Filed: Dec. 28, 2020

(65) Prior Publication Data
US 2021/0204101 A1 Jul. 1, 2021

(30) Foreign Application Priority Data

Dec. 26, 2019 (KN) .......................... 10-2019-0175641
Oct. 22, 2020 (KR) .......................... 10-2020-0137417

(51) Int. Cl.
*H04W 4/44* (2018.01)
*H04W 74/08* (2009.01)
(Continued)

(52) U.S. Cl.
CPC .............. *H04W 4/44* (2018.02); *H04W 72/02* (2013.01); *H04W 72/0446* (2013.01); *H04W 74/0816* (2013.01); *H04W 74/0891* (2013.01)

(58) Field of Classification Search
CPC .... H04B 7/2643; H04W 4/44; H04W 56/003; H04W 72/02; H04W 72/0446; H04W 74/0816; H04W 74/0891
See application file for complete search history.

(56) References Cited

U.S. PATENT DOCUMENTS 10,917,835 B2 * 2/2021 Baek ...................... H04W 8/005
2012/0188964 A1 * 7/2012 Zhang ............... H04W 72/0406
370/329

(Continued)

FOREIGN PATENT DOCUMENTS

KR 10-2019-0035426 A 4/2019

OTHER PUBLICATIONS

Office Action issued in counterpart Korean Application No. KR 10-2020-0137417 dated Sep. 27, 2021 (9 pages).

*Primary Examiner* — Kashif Siddiqui
(74) *Attorney, Agent, or Firm* — Osha Bergman Watanabe & Burton LLP

(57) ABSTRACT

The present application relates to a multichannel access control method in an overlapped vehicular network, and more specifically, a multichannel access control method in vehicular networks, for managing a Wireless Access in Vehicular Environments (WAVE) basic service set (WBSS) vehicular network which is managed by a WAVE extended service set control and management system (WESS-CM) and is provided by using a road side unit (RSU) in a plurality of vehicle environments having overlapped areas, comprising: configuring Time Division Multiple Access (TDMA)-slots (T-slots) divided from the synchronization interval with respect to the CCH and a Basic Safety Message channel (BSMCH) for each WBSS that has a control channel (CCH) and the BSMCH in which the synchronization interval are preset, and distributing T-slots divided from the CCH to a plurality of the WBSS; wherein the first T-slot of the group of T-slots of the CCH is used to broadcast a beacon message including TDMA information of the WBSS such as the identification of the WBSS and the number of T-slots used in the CCH such that a vehicular networking is performed (Continued)

normally even at various vehicle densities, thereby providing higher scalability, reliability, and flexibility.

11 Claims, 5 Drawing Sheets

(51) Int. Cl.
*H04W 72/04* (2009.01)
*H04W 72/02* (2009.01)

(56) References Cited

U.S. PATENT DOCUMENTS

| | | | | |
|---|---|---|---|---|
| 2013/0203461 | A1* | 8/2013 | Li | H04W 8/183 |
| | | | | 455/552.1 |
| 2015/0312883 | A1* | 10/2015 | Han | H04W 76/40 |
| | | | | 370/328 |
| 2015/0360611 | A1* | 12/2015 | Cherkaoui | G01S 13/931 |
| | | | | 340/436 |
| 2018/0167790 | A1* | 6/2018 | Cavalcanti | H04W 4/46 |

* cited by examiner

MULTICHANNEL ACCESS CONTROL METHOD IN OVERLAPPED VEHICLE NETWORKS

CROSS-REFERENCE TO RELATED APPLICATIONS

The present application claims the benefit under 35 U.S.C. 119(a) of Korean Patent Application No. 10-2019-0175641 filed on Dec. 26, 2019 and Korean Patent Application No. 10-2020-0137417 filed on Oct. 22, 2020 with the Korean Intellectual Property Office, the entire disclosure of which is incorporated herein by reference for all purposes.

BACKGROUND

1. Field

The present application relates to a multichannel access control method in an overlapped vehicular network based on wireless access in vehicular environment (WAVE), and more specifically, a multichannel access control method for managing, by using time division multiple access (TDMA) slot (T-slot), a plurality of WAVE basic service sets (WBSS) vehicular network having an overlapped area which is managed by a WAVE extended service set (WESS) control and management system (WESS-CM).

2. Description of Related Art

Vehicular networks are essential for the safety of Intelligent Transportation Systems (ITS), and for this purpose, it aims to improve the safety of vehicles driving on roads by broadcasting time-critical basic safety message (BSM) that includes information of vehicle position, moving direction, velocity, abnormal traffic and road conditions, and expected danger of collision.

In recent years, with the development of science and technology, self-driving car technology that automatically operates without a human driver has been developed, and due to the self-driving cars, the importance of an intelligent transportation system is further emphasized.

For intelligent transportation systems and vehicular network environments, international standards, such as IEEE 802.11p, IEEE 1609 and wireless access in vehicular environment (WAVE) have been developed, and Onboard Unit (OBU) that may use such vehicular network environments is installed on the vehicle to drive while maintaining high-speed mobility (up to 200 km/h) in the RF transmission range of up to 1 km between the vehicle (with OBU) and the road infrastructure (with RSU).

The IEEE 1609 standard defines the operation of WAVE in higher communication layers, including IEEE 1609.4 specifying extensions of the IEEE 802.11p standard for multichannel coordination of devices in which carrier sense multiple access with collision avoidance medium access control (CSMA/CA MAC) is used for control channel accesses. According to the IEEE 1609.4 specification, MAC coordinates multiple channels by dividing the channel access time interval (sync intervals) of a fixed length (100 ms) into a control channel interval (CCHI) and a service channel interval (SCHI). During CCHI, all OBUs must tune to the CCH frequency for Basic Safety Message (BSM) and system control message exchange.

However, the IEEE 1609.4 causes inefficient use of CCH and SCH due to the synchronous MAC sub-operation having a fixed control channel interval and a service channel interval, and there is a problem that it is limiting performance of adaptive and intelligent time allocation in response to variable traffic requests. To solve this problem, a method of dynamically adjusting the duration of CCHI to improve service saturation throughput by variable CCHI was suggested, thereby increasing the efficiency of CCH, but SCH resources are still wasted.

In addition, the BSM message exchanges in VANETs based on IEEE 802.11p and IEEE 1609 MAC protocol may suffer from unbounded delivery latency at higher traffic loads because of the underlying random access mechanism of carrier sense multiple access with collision avoidance (CSMA/CA).

Many research works reported that the multi-channel access scheme with CSMA/CA provides poor performances in reliable broadcast of safety messages with bounded delay, and also provides low throughput of non-safety message exchanges in dense vehicular ad hoc network environments due to increased collisions by multiple access.

In addition, when handover is performed through the vehicular network system as described above, in order to match the CCH frequency for the exchange of BSM and system control messages, all OBUs have to register/deregister at each handover and re-configure the RF channel frequency. As a result, unnecessary message exchange increases during handover procedure, which increases the risk of delays and errors due to the increased RF frame transmissions.

SUMMARY

In order to solve the above technical problem, there is provided a multichannel access control method in vehicular networks for managing a Wireless Access in Vehicle Environments (WAVE) basic service set (WBSS) vehicular network which is managed by WAVE extended service set control and management system (WESS-CM) and provided by using a road side unit (RSU) in a plurality of overlapped areas comprising: configuring a plurality of Time Division Multiple Access (TDMA)-slots (T-slots) in the synchronization interval with respect to the CCH; the service channels (SCHs) are primarily used as Basic Safety Message channel (BSMCH); each WBSS is allocated with at least one BSMCH; distributing the T-slots in the CCH to a plurality of the WBSS.

Further, the first T-slot of the CCH for each WBSS is used to broadcast a beacon message including TDMA information of the WBSS, such as the identification of the WBSS and the number of T-slots used in the CCH.

Further, the number of total T-slots in the BSMCH(s) allocated for each WBSS defines the maximum number of vehicles manageable per the WBSS within the synchronization interval.

Further, the beacon message comprises any one or more of the time division multiple access information of the WBSS which is required for a registration request of the vehicle requiring vehicle registration at entering the WBSS, allocation information of the T-slot for a service channel interval (SCHI), position information of the road side unit, and service radius information of the road side unit.

Further, the distributing the T-slot divided from the CCH to each of the WBSS is that the vehicle obtains information of the plurality of the WBSS from the beacon message broadcast for each of the WBSS by using one of the T-slot in the CCH in an overlapped vehicular network environment.

Further, the distributing the T-slot divided from the CCH to a plurality of the WBSS further comprises: dividing and using the T-slot into a carrier sense multiple access with collision avoidance (CSMA/CA) mode slot section and a time division multiple access (TDMA) mode slot section.

Further, the dividing and using the T-slot into the carrier sense multiple access with collision avoidance (CSMA/CA) mode slot section and the time division multiple access (TDMA) mode slot section further comprises: transmitting a registration request and a data transmission request of the new vehicle by using the CSMA/CA mode slot section.

Further, the transmitting the registration request and the data transmission request of the new vehicle further comprises: allocating the T-slot in the TDMA mode slot section by the road side unit which received the registration request and data transmission request for the new vehicle requested by randomly selecting the T-slot in the CSMA/CA mode slot section; and transmitting a response message to the registration request and the data transmission request of the new vehicle including the T-slot information of the allocated TDMA mode slot section.

Further, the transmitting the response message including the T-slot information further comprises: conducting registration of the new vehicle by performing an Association Request and data transmission by the new vehicle by using the road side unit and the allocated T-slot information.

Further, the conducting registration of the new vehicle further comprises: transmitting, by the road side unit, the Association Request message received from the new vehicle to the WESS-CM; transmitting the Association Ack message to the road side unit when the association of the new vehicle is approved in the WESS-CM; allocating, by the road side unit, any one of the T-slots in the BSMCH to the new vehicle, and transmitting, by the road side unit, the T-slot allocation information and the Association Ack message using the T-slot of the CCH.

Further, the dividing and using the T-slot into the CSMA/CA mode slot section and the TDMA mode slot section further comprises: dividing the T-slot of the TDMA mode slot section of the CCH; and broadcasting the beacon message including the T-slot configuration of the CSMA/CA mode slot section and the TDMA mode slot section and the T-slot configuration information which is transmitted using the first T-slot in the CCH area allocated for each of the WBSS.

Further, the dividing and using the T-slot into the CSMA/CA mode slot section and the TDMA mode slot section further comprises: determining whether the vehicle enters an overlapped area between the WBSS; and transmitting a vehicle Basic Safety Massage (BSM) to other vehicles in the WBSS area scheduled to enter by using the T-slot in the TDMA mode slot section when the vehicle enters the overlapped area.

DETAILED DESCRIPTION

Figure 1:
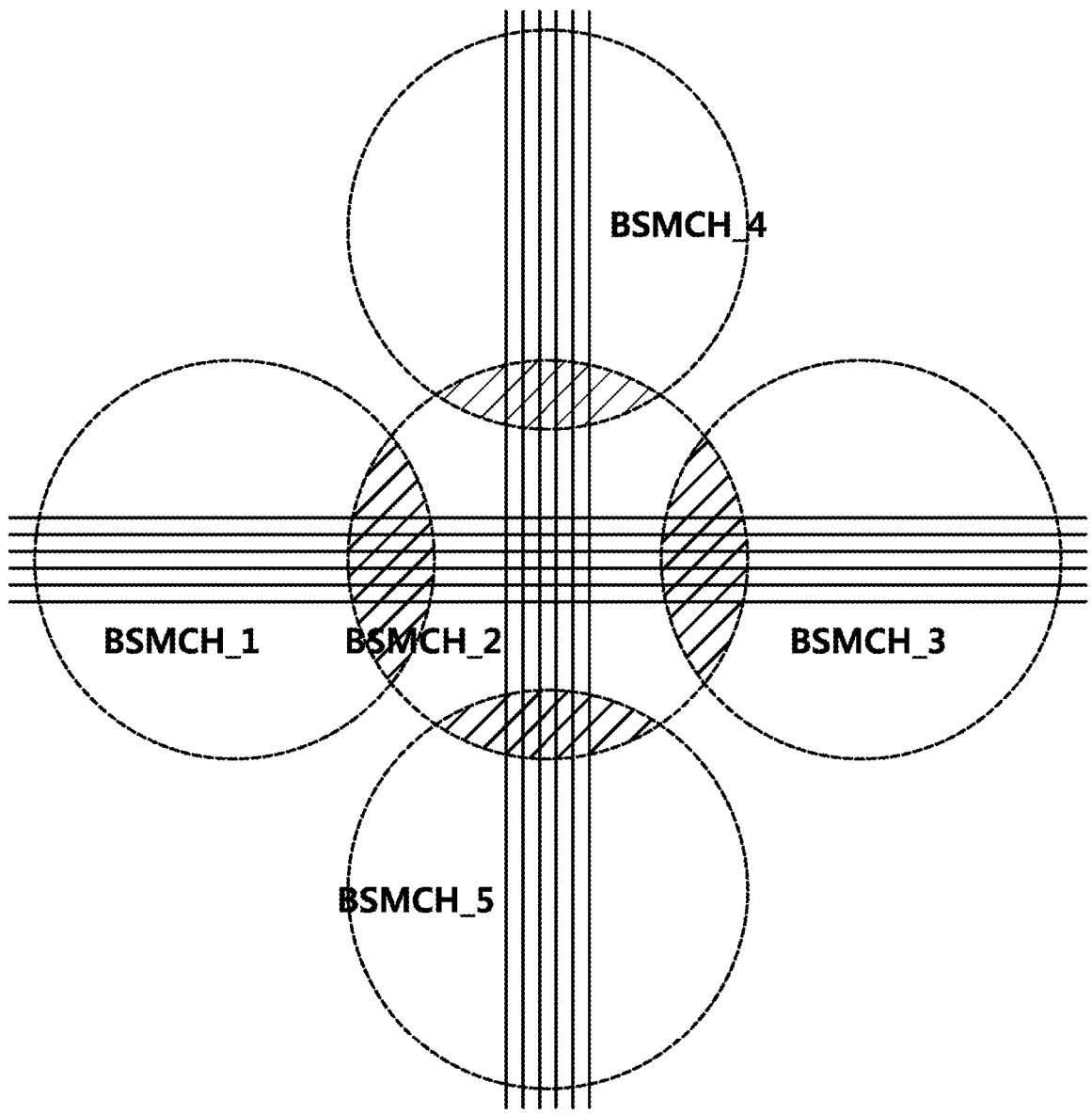
FIG. 1 illustrates an overlapped vehicular network environment.

In the present application, various changes may be made and various examples may be provided, and specific examples are illustrated in the drawings and described in detail.

However, this is not intended to limit the present application to a specific example, and it is to be understood to include all changes, equivalents, and substitutes included in the spirit and scope of the present application.

It is to be understood that the terms used in the present application are used only to describe specific examples, and are not intended to limit the present application. Singular expressions include plural expressions unless the context clearly indicates otherwise. In the present application, terms such as "comprise" or "have" are intended to designate the presence of features, numbers, steps, actions, components, parts, or combinations thereof described in the specification, and do not preclude in advance the possibility of the presence or addition of one or more other features, numbers, steps, actions, components, parts, or combinations thereof.

Unless otherwise defined, all terms, including technical or scientific terms, used herein have the same meaning as commonly understood by one of ordinary skill in the art to which the present application belongs. Terms such as those defined in a commonly used dictionary should be interpreted as having a meaning consistent with the meaning in the context of the related technology, and should not be interpreted as an ideal or excessively formal meaning unless explicitly defined in the present application.

Hereinafter, examples of the present application are described in more detail with reference to the accompanying drawings. In describing the present application, in order to facilitate an overall understanding, the same reference numerals are used for the same elements in the drawings, and duplicate descriptions for the same elements are omitted.

There are two simple scenarios of overlapped vehicular network (OVN): (a) bidirectional road with multiple lanes, and (b) bidirectional cross road with multiple lanes. In the road with multiple lanes, the vehicular networks are overlapped in linear sequence, and communication channels of each vehicular network will get interferences from its two neighbors by which the performance of the network is affected.

The present application is to solve the problem of the above technical problem by providing a multichannel access control method of vehicle networks by using a slotted TDMA multichannel MAC (STMC-MAC) for overlapped vehicular network (OVN) for metropolitan area with higher density vehicles, and an infrastructure with software defined networking as distribution system (SDN-DS).

The present application also provides a vehicle registration method using the slotted time division multiple access multichannel medium access control method in an area with higher density vehicles.

FIG. 1 is a diagram for explaining an overlapped vehicular network environment and illustrates a crossroad area in a city center.

In a vehicular network environment, one area may be integrally managed by a WAVE extended service set control and management system (WESS-CM).

However, because such a WESS-CM cannot operate wide service area by using one road side unit (RSU), the service area is divided into a plurality of sub-areas, and the divided sub-areas may configure a vehicular network by using a plurality of road side units included respectively.

In addition, a plurality of road side units constitute cells of Basic Safety Message (BSM) transmissions from vehicles within the WBSS, and because the cell area of transmitting a Basic Safety Message (BSM) is formed in a circular shape, overlapped cell areas provided by multiple WBSS using individual BSM channels (BSMCHs) to support all WESS service areas are managed by the WESS-CM.

In an urban crossroad area where there is a lot of vehicles, one BSMCH coverage area is to be small, and accordingly, the number of overlapping areas is further increased.

Referring to FIG. 1, BSMCH_1 has one overlapping area with BSMCH_2, but BSMCH_2 located at an intersection overlaps with four areas of BSMCH_1, BSMCH_3, BSMCH_4, and BSMCH_5 for managing vehicles entering each intersection, and interference may occur among some channels used in such overlapped areas.

For example, some areas used in BSMCH_2 overlap with four areas of BSMCH_1, BSMCH_3, BSMCH_4, and BSMCH_5, and thus may get interference from the channels used in BSMCH_1, BSMCH_3, BSMCH_4 and BSMCH_5.

In an example of the present application, one BSMCH area is illustrated as performing an operation by using one road side unit (RSU), but it is not limited thereto, and the number of road side units may be varied as necessary.

In the following description, an area using one BSMCH is defined as WBSS (WAVE Basic Service Set), and the description is made under the assumption that WBSS refers to one BSMCH area and at the same time having one RSU, however, it is not limited thereto and may be configured in various forms.

In the present application, as a technology for removing such interference and for broadcasting a stable Basic Safety Message (BSM), a STMC-MAC (slotted TDMA Multichannel MAC) using a TDMA slot (T-slot) in a TDMA (time division multiple access) based MAC protocol may be used.

STMC-MAC allows T-slots in CCH synchronization interval to be pre-reserved for onboard units (OBUs) in a specific vehicle based on a scheduling pre-processed by a centralized cluster header (such as RSU), and the OBU performs broadcasting of Basic Safety Messages (BSMs) by using a T-slot reserved in advance to avoid channel contention in Basic Safety Message (BSM) exchange, thereby improving performance.

In particular, in a bidirectional intersection as illustrated in FIG. 1, a vehicular network at around the center of an intersection get interference from its four neighbors, and thus, the center WBSS cannot use the same frequency channel as its neighboring WBSS. Therefore, in the cell planning of WBSS, it is necessary to pay attention to the allocation of frequency channels and transmission time for the WBSS and its adjacent WBSS to avoid unnecessary collisions.

In order to solve the above problems, the communication between the WBSS and the vehicle of the present application may use a dual radio interfaces, and the dual radio may use a control channel (CCH) shared by a plurality of WBSS. Hereinafter, in FIGS. 2 and 3, a method of allocating a T-slot of a CCH and a BSMCH is described.

Here, the BSMCH may be used for the operation of a service channel (SCH), and the SCH uses a T-slots allocated by RSU, and vehicle may transmit service messages at a certain interval.

Such a BSM may include information related to vehicle safety, such as GPS position information, direction of driving, and velocity of the vehicle.

For the stable broadcasting of the BSM, in the present application, it is suggested to use a STMC-MAC method which is improved from the time division multiple access (TDMA) method suggested in several researches to improve the performance of the vehicular network for stable broadcasting of Basic Safety Messages.

The T-slot used in the STMC-MAC protocol may be reserved for an onboard unit (OBU) that performs communication in a vehicle based on pre-processed scheduling by a centralized cluster header. If a T-slot reserved in advance is used for periodic BSM broadcasting, channel contention for Basic Safety Message (BSM) exchange may be avoided, thereby improving the performance.

The CCH may be used for communication between the vehicles and the RSU.

Figure 2:
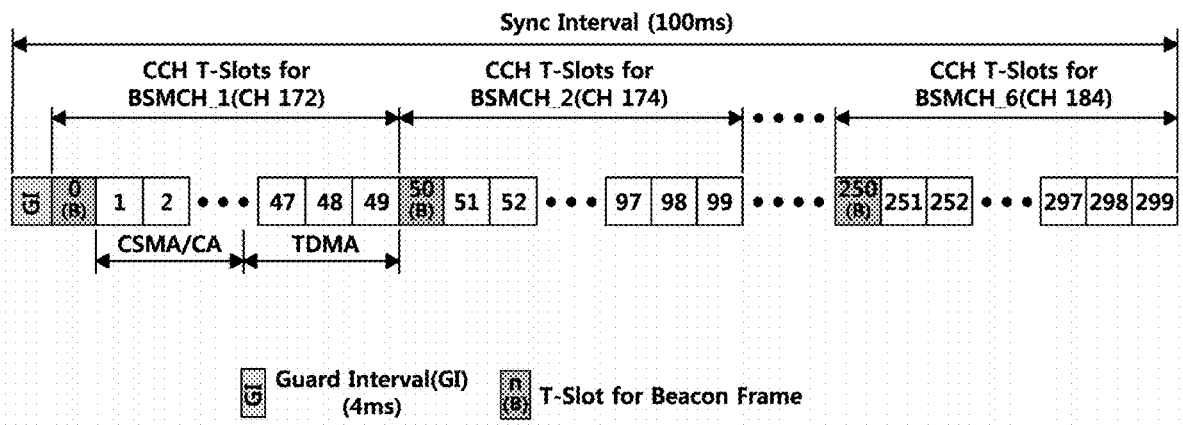
FIG. 2 illustrates slot division of a control channel according to an example of the present application.

FIG. 2 illustrates slot division of a control channel (CCH) according to an example of the present application.

As a CCH scheduling distribution method for contention-free BSM broadcast, according to an example of the present application, CCH and BSMCH may be used in a method synchronizing TDMA-based BSM broadcast in unit of T-slot to minimize contention and to increase utilization.

One synchronization interval may be divided into multiple T-slots according to a preset criterion, and a 4 ms of Guard Interval is placed at the front of each synchronization interval to prevent possible collisions between each synchronization interval.

A plurality of T-slots within one synchronization interval may be divided into a plurality of groups according to the number of WBSS (or BSMCHs) managed by the WESS-CM.

In an example of the present application, a CCH having a synchronization interval of 100 ms may be divided into 300 T-slots, and the 300 T-slots may be grouped to allocate 300/N slots to each WBSS.

The first T-slot of each group consisting of 300/N T-slots is allocated to a beacon frame broadcasts.

The beacon frame may include time division multiple access information of the WBSS required for registration request of the vehicle requiring vehicle registration by entering the WBSS, T-slot allocation information for a service channel (SCH) interval, position information of the road side unit and WBSS radius information.

Some of the T-slots excluding the beacon frame in one group may be used in the CSMA/CA method, while the remaining T-slots may use the TDMA method.

The CSMA/CA method may be used for access request of a new vehicle entering the WBSS area, and a TDMA section may be used for conducting registration of new entering vehicles.

In an example of the present application, the synchronization interval is exemplified as 100 ms, but is not limited thereto, and the interval may vary according to need or setting, and the number of T-slots and the number of groups may vary dynamically or statically depending on the number of WBSS and the number of driving vehicles and the like.

Figure 3:
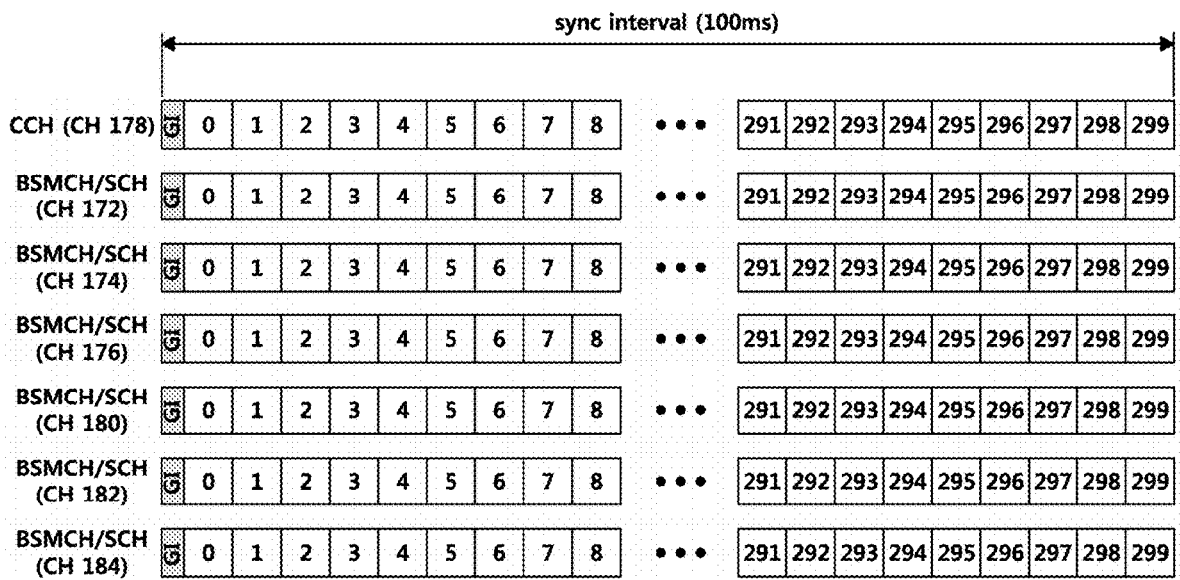
FIG. 3 illustrates a T-slot division of the control channel (CCH) and Basic Safety Message channels (BSMCHs) according to the example of the present application.

FIG. 3 is a diagram for explaining a T-slot of a BSMCH using SCH (Hereinafter, BSMCH/SCH) in WBSS.

In the BSMCH/SCH of the present application, like the CCH, one synchronization interval may be divided into a plurality of T-slots according to a preset criterion, and a guard interval of 4 ms is placed at the front of each synchronization interval to avoid collisions that may occur between synchronization intervals.

In the BSMCH/SCH and CCH used in the dual radio method, the CCH is used by dividing the 300 T-slots for one synchronization interval into a plurality of WBSS, respectively, while the BSMCH/SCH is used as an independent channel, so that one BSMCH/SCH may be used in one WBSS.

That is, the whole one BSMCH/SCH is allocated to one WBSS, and is used to broadcast the BSM of the vehicles within the WBSS by using T-slots in the BSMCH/SCH within one synchronization interval in one channel.

However, the number of T-slots within one synchronization interval is 300, and if one T-slot is distributed to one vehicle, only 300 vehicles may be managed in one WBSS. It may be inefficient and difficult to use in areas with heavy traffic, such as downtown.

When the RF channel frequency of 5.855~5.925 GHz range of IEEE 802.11p, and the message length of beacon and BSM is within 100 bytes, the duration of the T-slot may be set as 320 micro-seconds that allows up to 300 T-slots in one synchronous interval.

The duration of the T-slot can be reduced when a higher RF channel frequency is used or when beacon and/or BSM size is reduced; and the number of T-slots in one synchronization interval can be increased.

In addition, if there are some not-allocated T-slots in the BSMCH because the number of vehicles in the vehicular network is a small number less than 300, the not-allocated T-slots may be used for service traffic, and the T-slots used for service traffic may be set and managed by the WBSS.

Figure 4:
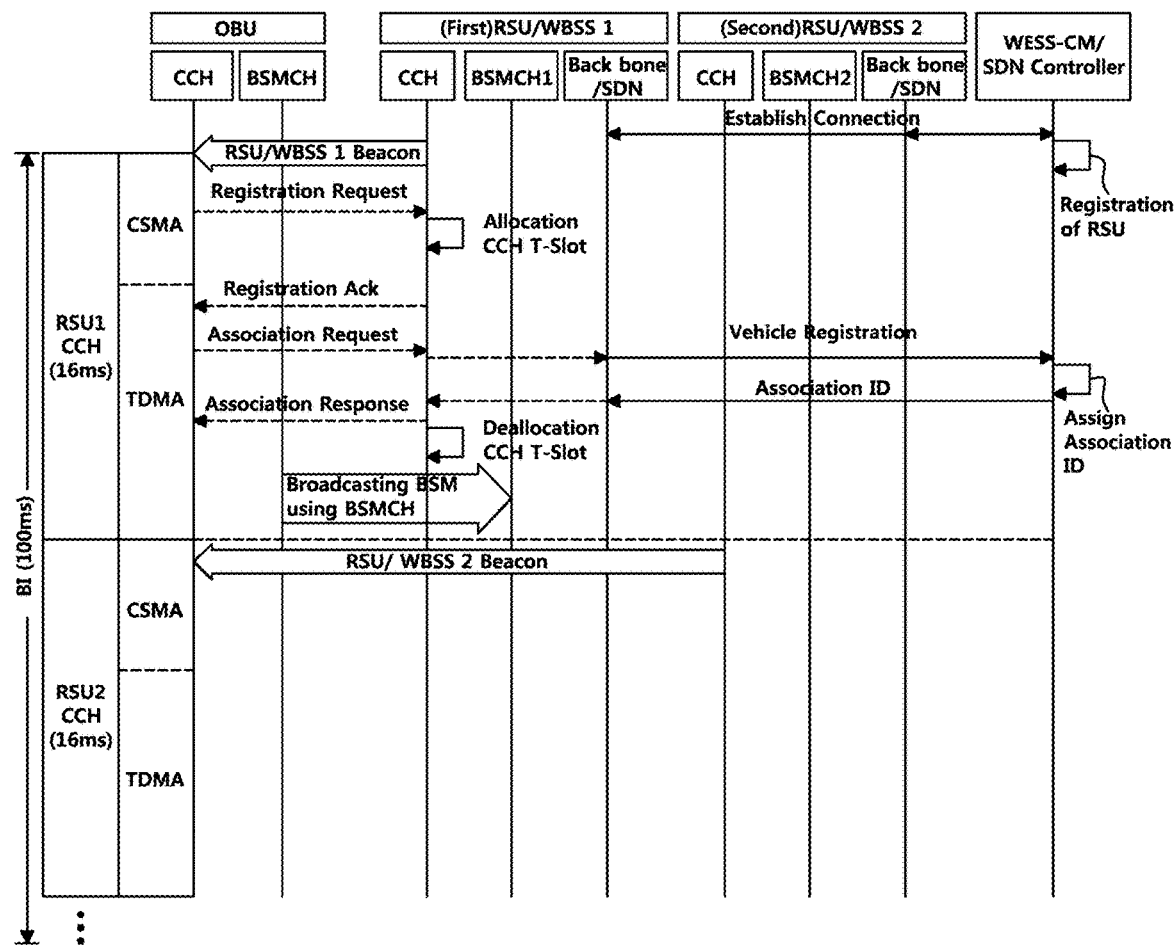
FIG. 4 illustrates a procedure for conducting registration of a new vehicle according to the example of the present application.

FIG. 4 illustrates a procedure for conducting registration of a new vehicle according to an example of the present application.

While the WESS-CM maintains an association status with the RSU in the WBSS through the backbone network, the association status of RSU may be managed by transmitting and receiving information such as the position of the RSU, the usage status of the T-slot, the number of vehicles managed by the WBSS, and the position of the vehicle.

The backbone network interconnects multiple WBSS configuring a large-scale WESS, and it may be implemented by Gigabit Ethernet switches and software-defined networking (SDN) technology with some hierarchy where the SDN controller can provide optimized resource utilization and centralized control. The example of the present application describes a configuration of operations by using internet, however, it is not limited thereto, and any wide-area transport networking technology capable of performing broadband communication between the RSU and the WESS-CM may be used.

When the OBU-installed vehicle enters the WBSS area managed by the WESS-CM, the beacon frame may be received through the CCH of the RSU in the corresponding WBSS.

The vehicle receiving the beacon frame message may transmit a registration request message by using an arbitrary T-slot included in the CSMA/CA section among the T-slots of the CCH as illustrated in FIG. 4.

By using the CSMA/CA section for new registration, collisions between registration request messages may be minimized even if a plurality of vehicles simultaneously enter the WBSS.

When the registration request message of the vehicle is received, the RSU of WBSS allocates a T-slot among the currently available T-slots included in the TDMA section of the T-slots of the CCH to the vehicle, and transmits the Registration Ack message including allocated T-slot information.

In addition, the RSU may notify the WESS-CM that a new vehicle has registered through the backbone network.

When the WESS-CM is notified that a new vehicle has registered at the RSU, an Association Identifier (AID) for the registered new vehicle is issued and delivered to the RSU.

The vehicle transmits an Association Request message to the RSU by using the allocated T-slot included in the Registration Ack message.

The Association Request message may be transmitted by using a unicast method which is a method of delivering a data packet only to one specific recipient.

Upon receiving the Association Request message, the RSU may allocate a T-slot of the BSMCH/SCH channel, and transmit an Association Response message including the allocated T-slot information and association identifier (AID) information to the vehicle.

Upon receiving the Association Response message, the vehicle may transmit a periodic Basic Safety Message (BSM) at an interval of 100 ms by using a T-slot in the BSMCH/SCH designated in the received Association Response message.

An example of the present application describes the configuration of the BSM message being transmitted an interval of 100 ms, but the transmission interval of the BSM message may vary in consideration of various situations such as vehicle traffic, communication conditions, and weather conditions.

Through such a vehicle registration procedure, the registration request message and the Registration Ack message of the vehicle are transmitted using T-slots in CSMA/CA mode section and TDMA mode section in the CCH, thereby preventing collisions of registration request and Ack messages related to vehicle registration in advance.

In addition, by broadcasting a BSM message by using a T-slot in BSMCH/SCH by using the TDMA method, collision of BSM broadcasting between vehicles in the WBSS area may be prevented.

Figure 5A:
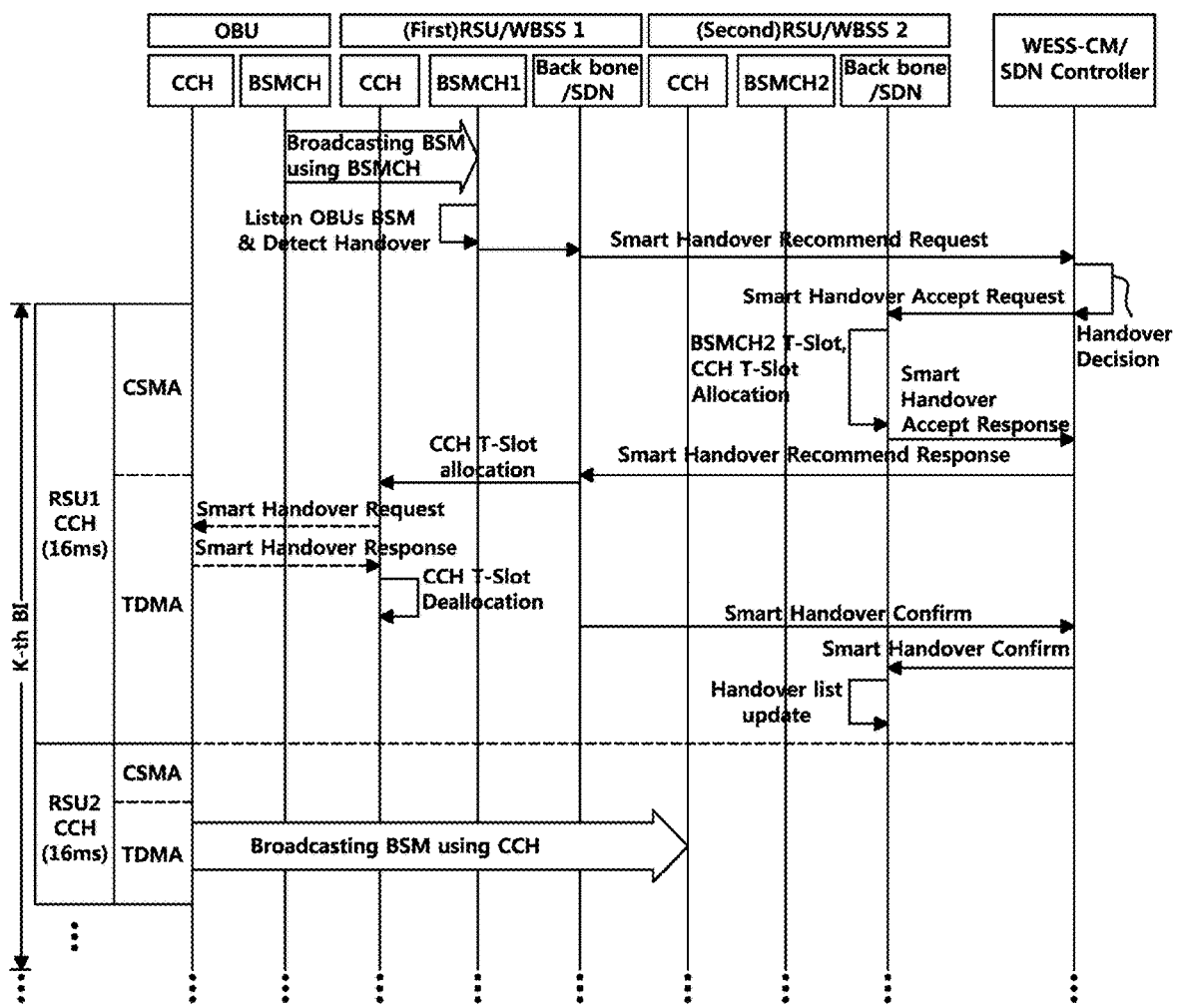
FIGS. 5A and 5B illustrate a vehicle handover procedure according to the example of the present application.
Figure 5B:
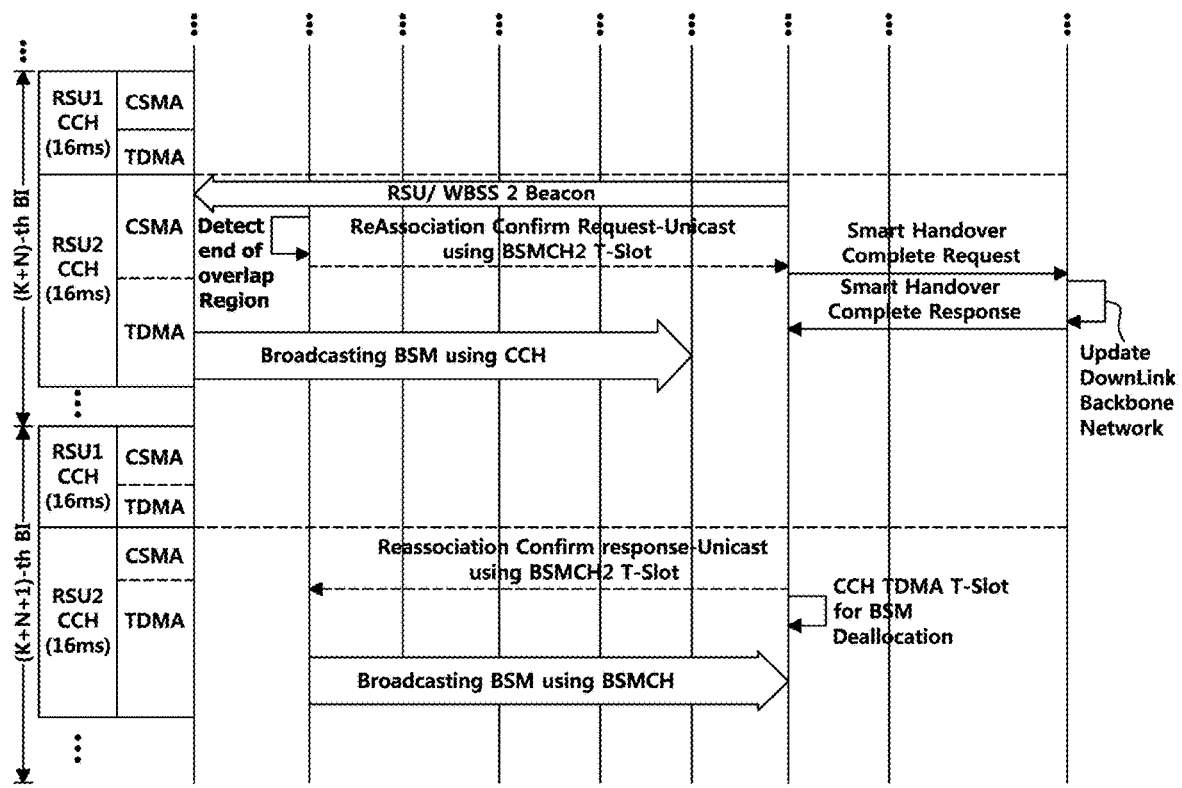

FIGS. 5A and 5B illustrate a vehicle handover procedure according to an example of the present application.

The registered vehicle transmits a BSM message to the current RSU (Hereinafter, referred to as first RSU) at a preset interval, and a handover may be performed when the vehicle enters overlapped vehicular networks while moving in the WBSS.

The first RSU may receive the BSM broadcast from the vehicle and detect the necessity of handover in consideration of the vehicle's velocity, current position, and driving direction.

When it is determined that the vehicle needs handover, the first RSU may transmit a Smart Handover Recommend Request message to the WESS-CM through the backbone network.

The Handover Recommend Request message may include information such as vehicle association identifier (AID), WAVE vehicular network basic service set identifier (WBSSID), vehicle information (vehicle velocity, current position, driving direction, etc.).

When receiving the smart Handover Recommend Request message from the first RSU, the WESS-CM may search the available WBSS around the first RSU based on vehicle information to determine the most suitable WBSS for handover.

The WESS-CM may transmit a Smart Handover Accept Request message through the backbone network to the RSU (Hereinafter, referred to as second RSU) of the determined WBSS to perform the handover.

The Smart Handover Accept Request message may include information such as WBSSID and vehicle information.

When the Smart Handover Accept Request message is received from the WESS-CM, the second RSU allocates a T-slot of the BSMCH/SCH and a T-slot of the CCH which are currently being used, and the Smart Handover Accept Response message including the allocated T-slot of the BSMCH/SCH and the T-slot of CCH may be transmitted to the WESS-CM through the backbone network.

The WESS-CM prepares the Smart Handover Recommend Response message to include the information included in the Smart Handover Accept Response message which is received from the second RSU, and send it to the first RSU through the backbone network.

When the Smart Handover Recommendation Response message is received, the first RSU prepares the Smart Handover Request message that include information of the T-slot of the BSMCH/SCH and the T-slot of the CCH included in the Smart Handover Recommendation Response message, and transmits it to the OBU.

Upon receiving the Smart Handover Request message, the vehicle may transmit a Smart Handover Response message to the first RSU in a unicast method.

Upon receiving the Smart Handover Response message, the first RSU may return T-slot information of the CCH allocated to the vehicle by the second RSU and terminate communication with the vehicle.

Upon receiving the beacon frame message transmitted from the second RSU, the vehicle may transmit a ReAssociation Confirm Request message to the second RSU in a unicast method by using the T-slot information of the BSMCH/SCH included in the Smart Handover Request message.

When a ReAssociation Confirm Request message from the vehicle is received, the second RSU may transmit a Smart Handover Complete Request message to the WESS-CM through the backbone network.

When WESS-CM receives Smart Handover Complete Request message from the second RSU, the DownLink Backbone Network for the handovered vehicle may be updated, and a Smart Handover Complete Response message may be transmitted to the second RSU through the backbone network.

When the second RSU receives the Smart Handover Complete Response message from the WESS-CM, the smart handover operation is completed by transmitting a ReAssociation Confirm Response message to the vehicle through the T-slot of the BSMCH/SCH allocated to the vehicle.

When handover is performed through the handover procedure as described above, there is no need for exchanging registration control messages for each vehicular network basic service set so that it is possible to perform stable operation by reducing unnecessary RF message transmission in the handover procedure.

In addition, by allocating a Basic Safety Message channel that is not duplicated in each vehicular network basic service set, it is possible to transmit messages up to 300 with stable vehicles.

In addition, an example of the present application provides a slotted TDMA multichannel MAC (STMC-MAC) for an overlapped vehicular network in a metropolitan area with high-density vehicles, and by performing the normal execution of the overlapped vehicular network through a software-defined network (SDN)-based distributed system, the operation may be performed with higher scalability, reliability and flexibility.

The vehicular network according to the example of the present application may provide higher scalability, reliability and flexibility by performing vehicular networking normally even at various vehicle densities.

The vehicular network according to an example of the present application may provide a stable communication environment without delay in a metropolitan area with high vehicle density.

A vehicular network according to an example of the present application may provide a stable communication environment by preventing a message collision by using a service channel and a control channel together.

The vehicular network according to an example of the present application may provide a stable communication environment by preventing message collisions between vehicles by performing an operation by allocating a non-overlapping Basic Safety Message channel to each vehicle.

Features, structures, effects, etc. described in the above-described examples are included in at least one example of the present application, and are not necessarily limited to only one example. Furthermore, the features, structures, effects, etc. illustrated in each example may be combined or modified for other examples by a person having ordinary skill in the art to which the examples belong.

Therefore, contents related to such combinations and modifications should be interpreted as being included in the scope of the present application. In addition, although described with respect to the examples, these are only examples and do not limit the present application, and it is apparent for a person having ordinary skill in the art to which the present application pertains that various modifications and applications are possible which are not illustrated above without departing from the essential characteristics of the present example. For example, each component specifically illustrated in the examples may be modified and implemented. And differences related to these modifications and applications should be construed as being included in the scope of the present application defined in the appended claims.

What is claimed is:

1. A multichannel access control method in vehicular networks, for managing a Wireless Access in Vehicle Environments (WAVE) basic service set (WBSS) vehicular network which is managed by a WAVE extended service set control and management system (WESS-CM) and provided by using a road side unit (RSU) in a plurality of vehicle environments having overlapping areas, comprising:
   configuring multiple Time Division Multiple Access (TDMA)-slot (T-slot) in the control channel (CCH) and Basic Safety Message channel (BSMCH) of the WBSS in each synchronization interval, where the synchronization interval is preset;
   distributing the group of T-slots divided from the CCH to a plurality of the WBSS;
   wherein the first T-slot of the T-slot group for each WBSS is used to broadcast a beacon message including TDMA information of the WBSS such as the identification of the WBSS and the number of T-slots used in the CCH.

2. The method of claim 1,
   wherein the configuring the T-slot, further comprises:
      dividing the synchronization interval of the CCH and the BSMCH into a plurality of T-slots, and
      wherein the number of T-slots is the maximum number of vehicles available per the WBSS within the synchronization interval.

3. The method of claim 1, wherein the beacon message comprises any one or more of the time division multiple access information of the WBSS, allocation information of the T-slot for a service channel interval (SCHI), position information of the road side unit, and service cell radius information of the road side unit which are required for a registration request of the vehicle requiring vehicle registration by entering the WBSS.

4. The method of claim 1, wherein the distributing the T-slot divided from the CCH to each of the WBSS is that the vehicle obtains information of the plurality of the WBSS from the beacon message broadcast for each of the WBSS by using one of the T-slot in CCH for an overlapped vehicular network environment.

5. The method of claim 2, wherein the distributing the T-slot divided from the CCH to a plurality of the WBSS further comprises:
dividing and using the T-slot into a carrier sense multiple access with collision avoidance (CSMA/CA) mode slot section and a time division multiple access (TDMA) mode slot section.

6. The method of claim 5, wherein the dividing and using the T-slot into the carrier sense multiple access with collision avoidance (CSMA/CA) mode slot section and the time division multiple access (TDMA) mode slot section further comprises:
transmitting a registration request and a data transmission request of the new vehicle by using the CSMA/CA mode slot section.

7. The method of claim 6, wherein the transmitting of the registration request and the data transmission request of the new vehicle further comprises:
allocating the T-slot in the TDMA mode slot section by the road side unit which receives the registration request and data transmission request from the new vehicle by randomly selecting the T-slot in the CSMA/CA mode slot section; and
transmitting a response message for the registration request and the data transmission request of the new vehicle, and the message includes T-slot information of the allocated the TDMA mode slot section.

8. The method of claim 7, wherein the transmitting the response message including the T-slot information further comprises:
conducting registration of the new vehicle by performing association request and data transmission by the new vehicle by using the road side unit and the allocated T-slot information.

9. The method of claim 8, wherein the conducting registration of the new vehicle further comprises:
transmitting, by the road side unit, an Association Request message received from the new vehicle to the WESS-CM;
transmitting an Association Ack message to the road side unit when the association of the new vehicle is approved in the WESS-CM;
allocating, by the road side unit, any one of the T-slots in the BSMCH to the new vehicle; and
transmitting, by the road side unit, the T-slot allocation information and the Association Ack message by using the T-slot of the CCH.

10. The method of claim 5, wherein the dividing and using the T-slot in the CSMA/CA mode slot section and the TDMA mode slot section further comprises:
allocating a group of T-slots of the TDMA mode slot section of the CCH to each WBSS; and
broadcasting the beacon message including the T-slot configuration of the CSMA/CA mode slot section and the TDMA mode slot section and the T-slot configuration information which is transmitted in the first T-slot of the group of T-slots in the CCH allocated for each WBSS.

11. The method of claim 10, wherein the dividing and using the T-slot into the CSMA/CA mode slot section and the TDMA mode slot section further comprises:
determining whether the vehicle enters an overlapping area between the WBSS; and
transmitting a vehicle Basic Safety Message (BSM) to other vehicles in the WBSS, scheduled to enter, by using the T-slot in the TDMA mode slot section in CCH when the vehicle enters the overlapped area.

* * * * *